United States Patent [19]
Griese et al.

[11] Patent Number: 6,128,683
[45] Date of Patent: Oct. 3, 2000

[54] METHOD AND SYSTEM FOR ALLOWING A PLURALITY OF SCSI HOSTS TO INTERACT WITH A DASD STORAGE SUBSYSTEM

[75] Inventors: Michael Allen Griese, Byron, Minn.; Barrie Neil Harding, San Jose, Calif.; Dennis Carl Mairet, Rochester, Minn.

[73] Assignee: International Business Machines Corporation, Armonk, N.Y.

[21] Appl. No.: 09/090,816

[22] Filed: Jun. 4, 1998

[51] Int. Cl.[7] .............................. G06F 13/42; G06F 13/00
[52] U.S. Cl. .......................... 710/107; 710/101; 710/105
[58] Field of Search .................................... 710/105, 107, 710/126, 129, 131, 100, 8, 62, 11, 2, 73, 36, 63, 74, 101; 711/100, 112; 709/250, 203, 213, 227, 253; 714/5; 712/9, 29; 340/825, 825.52; 370/438, 386, 466

[56] References Cited

U.S. PATENT DOCUMENTS

| | | | |
|---|---|---|---|
| 5,191,653 | 3/1993 | Banks et al. | 395/275 |
| 5,457,784 | 10/1995 | Wells et al. | 395/829 |
| 5,471,634 | 11/1995 | Giorgio et al. | 395/600 |
| 5,518,418 | 5/1996 | Larabell . | |
| 5,519,883 | 5/1996 | White et al. | 395/840 |
| 5,524,268 | 6/1996 | Geldman et al. | 395/825 |
| 5,544,326 | 8/1996 | Pease et al. | 395/250 |
| 5,615,344 | 3/1997 | Corder | 395/309 |
| 5,640,592 | 6/1997 | Rao | 395/825 |
| 5,659,690 | 8/1997 | Stuber et al. | 395/309 |
| 5,659,801 | 8/1997 | Kopsaftis | 395/882 |
| 5,671,355 | 9/1997 | Collins | 395/200.2 |
| 5,734,872 | 3/1998 | Kelly | 395/500 |
| 5,740,466 | 4/1998 | Geldman et al. . | |
| 5,961,627 | 10/1999 | Fok et al. . | |

*Primary Examiner*—Gopal C. Ray
*Attorney, Agent, or Firm*—Sawyer Law Group LLP; Noreen A. Krall

[57] ABSTRACT

The present invention provides a system for configuration and running a DASD storage subsystem where the small computer system interface (SCSI) Target behavior needs to be different depending on type and characteristics of the attaching SCSI hosts. The configuration process defines the behavior by SCSI bus port through the use of bus behavior tables. Accordingly, several ports are able to operate correctly based on the hosts that attach to separate ports. In a first aspect, a direct access storage device (DASD) storage subsystem is described. The DASD storage subsystem comprises a plurality of ports, each of the plurality of ports including a table. Each of the tables defines the behavior of the particular port as a SCSI target. The DASD storage subsystem includes a mechanism for configuring the plurality of ports utilizing the tables within the ports. In a second aspect, a SCSI system is described. The SCSI system comprises a plurality of SCSI hosts and a DASD storage subsystem. The DASD storage subsystem comprises a plurality of ports. Each of the plurality of ports is coupled to one or more of the plurality of SCSI hosts. Each of the plurality of ports includes a table. Each of the tables defines the behavior of the particular port as a SCSI target. The DASD storage subsystem also includes a mechanism for configuring the plurality of ports utilizing the tables within the ports.

18 Claims, 3 Drawing Sheets

METHOD AND SYSTEM FOR ALLOWING A PLURALITY OF SCSI HOSTS TO INTERACT WITH A DASD STORAGE SUBSYSTEM

FIELD OF THE INVENTION

The present invention relates generally to DASD storage subsystems and more particularly to a system and method for allowing a plurality of SCSI hosts to interact with a DASD storage subsystem.

BACKGROUND OF THE INVENTION

Direct Access Storage Devices (DASD) storage subsystems communicate with various small computer system interface (SCSI) hosts over a SCSI bus. For example, a DASD storage subsystem, such as model No. 2105 DASD storage subsystem manufactured by IBM, can be utilized with a variety of SCSI hosts such as an RS-6000 host, Sun Microsystems host, NCR host, or an AS/400 host, through a SCSI bus. In conventional systems, a particular set of microcode is utilized to control the port or ports within the storage subsystem to which the SCSI host is attached.

Typically a particular storage subsystem is configured to interact with a SCSI host that has certain behavioral characteristics. In so doing, a SCSI host that has different characteristics can not be coupled to the port. Although all SCSI hosts are capable of running on a SCSI bus, an SCSI host's data block sizes may be different. For example, an AS/400 SCSI host will support a block size that is 520 bytes, where, for example, other SCSI hosts, such as a Sun or NCR host, only support a 512 byte data block. Accordingly, it is not possible for there to be a direct data exchange between those two types of SCSI host.

In addition, although a SCSI host has certain behavior that is based on its stated parameters, it has been learned empirically that under certain environments, a particular SCSI host will not operate in accordance with stated parameters. Accordingly, it is sometimes necessary to modify the parameters associated with a particular SCSI host when utilized in a particular environment. Once again, although it is known that this is possible to do for a specific SCSI host coupled to a specific port, heretofore conventional systems address this problem by having unique code for a particular host type. This approach, however, is unwieldy as different SCSI hosts are attached to a particular subsystem and there is a variety of behaviors associated with each of those hosts. It is known, for example, to personalize a particular port for a particular SCSI host. However, heretofore it has not been possible to have one storage subsystem that can interact with a variety of SCSI hosts at the same time.

Finally, there are some instances where SCSI hosts can run under the same or similar conditions. Once again, as it has been described above, conventional storage subsystems typically only accommodate one type of SCSI host.

Accordingly, what is needed is a system and method for allowing a plurality of SCSI hosts to communicate with a single storage subsystem, even in those instances where the various SCSI hosts have different behaviors. The system should be easy to implement and adaptable to conventional storage systems. Accordingly, what is desired is a universal storage subsystem which could be readily adaptable to a variety of SCSI hosts with a variety of different behaviors. The present invention addresses such a need.

SUMMARY OF THE INVENTION

The present invention provides a system for configuration and running a DASD storage subsystem where the small computer system interface (SCSI) Target behavior needs to be different depending on type and characteristics of the attaching SCSI hosts. The configuration process defines the behavior by SCSI bus port through the use of bus behavior tables. Accordingly, several ports are able to operate correctly based on the hosts that attach to separate ports.

In a first aspect, a direct access storage device (DASD) storage subsystem is disclosed. The DASD storage subsystem comprises a plurality of ports, each of the plurality of ports including a table. Each of the tables defines the behavior of a SCSI target appearing on a particular port. The DASD storage subsystem includes means for configuring the plurality of ports utilizing the tables within the ports.

In a second aspect, a SCSI system is disclosed. The SCSI system comprises a plurality of SCSI hosts and a DASD storage subsystem. The DASD storage subsystem comprises a plurality of ports. Each of the plurality of ports is coupled to one or more of the plurality of SCSI hosts. Each of the plurality of ports includes a table. Each of the tables defines the behavior of a SCSI target attached to a particular port. The DASD storage subsystem also includes means for configuring the plurality of ports utilizing the tables within the ports.

DETAILED DESCRIPTION OF THE INVENTION

The present invention relates to a system for allowing a plurality of SCSI hosts to interact with a storage subsystem. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
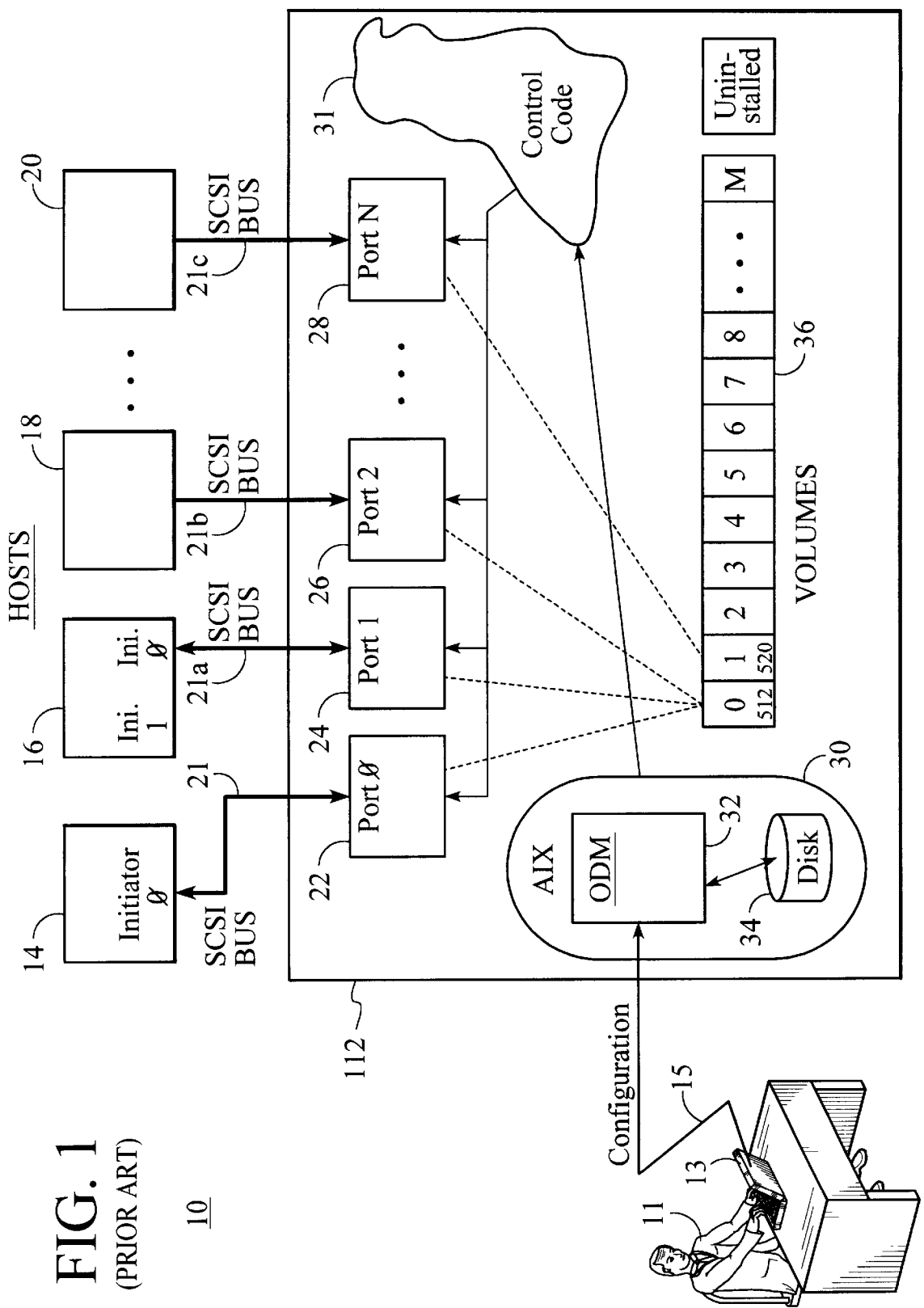
FIG. 1 is a block diagram of a conventional storage subsystem.

FIG. 1 is a block diagram of a conventional SCSI system 10 with DASD storage subsystem 12 coupled to a plurality of SCSI hosts 14, 16, 18 and 20 via SCSI busses 21, 21a, 21b and 21c. It should be understood that FIG. 1 is a simplified block diagram that describes the features that are important to the present invention. One of ordinary skill in the art recognizes that there are a variety of other components and details that are conventional that would be used to implement the various features and elements described herein.

As is seen, a customer or engineer 11 provides configuration information via line to control an object data manager (ODM 32) within the memory 30 of the DASD storage subsystem 12 which in a preferred embodiment runs under a UNIX operating system. This object data manager 32 communicates with a disk 34 within the DASD storage subsystem 12. A plurality of ports 22, 24, 26 and 28 are provided which allow for communication between the DASD storage subsystem 12 via the SCSI busses 21, 21a, 21b and 21c.

Typically within the memory 30 of the DASD storage subsystem 12 is control code 31 which is utilized to control the ports 22–28 in a manner that is consistent with the attached SCSI hosts 14–20. There are also a plurality of volumes 36 located within the storage subsystem 12 to provide the data storage of the subsystem 12. Accordingly, in this type of environment, the control code 31 is utilized to control the ports 14–20 in a manner which allows for efficient interaction between the plurality of SCSI hosts 14–20 and the storage subsystem 12. In this type of system the control code 31 is utilized to configure the ports 22–28 via line 33 to allow for communication between the DASD storage subsystem 12 and the plurality of SCSI hosts 14–20.

Accordingly, when an SCSI host is utilized, which is not compatible with the port then the port has to be reconfigured. In certain circumstances, it is impossible for a particular type of SCSI host, for example an AS/400 SCSI host, to interact with the same type of port that, for example, an RS/6000 SCSI host interacts with. This is because the data block sizes are different, that is, for an RS/6000 the data block is 512 bytes, where for an AS/400, the data block is 520 bytes. There is no ability to share data utilizing these two different SCSI hosts.

Accordingly, for a different SCSI host to be utilized that does not have the same characteristics of the first SCSI host, a reconfiguration of the control code is required in a manner which would allow the host to interact with that particular port. This reconfiguration is an extremely time-consuming and expensive process and does not allow for flexibility in the storage subsystem operation.

In addition, although a plurality of SCSI hosts 14–20 can be utilized with the DASD storage subsystem 10, all of the SCSI hosts 14–20 must have similar behaviors to communicate with subsystem 10. Accordingly, in conventional systems, it is not possible to run, for example, a AS/400 SCSI host on the same DASD storage subsystem upon which Sun SCSI host is running.

Accordingly, the present invention is directed to a method and system for allowing for a flexible storage subsystem which allows a plurality of SCSI hosts to be coupled thereto. The system will also allow for some SCSI hosts to be attached to the same port within the subsystem. This is accomplished through the use of a bus behavior table within each of the ports. These behavior tables define the characteristics of the particular SCSI host that is to be attached to a particular port. In so doing, multiple ports can be provided within the storage subsystem, each of them having its own bus behavior table. The bus behavior table thereby personalizes the behavior of the DASD storage subsystem in a manner that allows for optimum operation of the SCSI. With the present invention, there is no need to modify the control code to personalize the ports.

Figure 2:
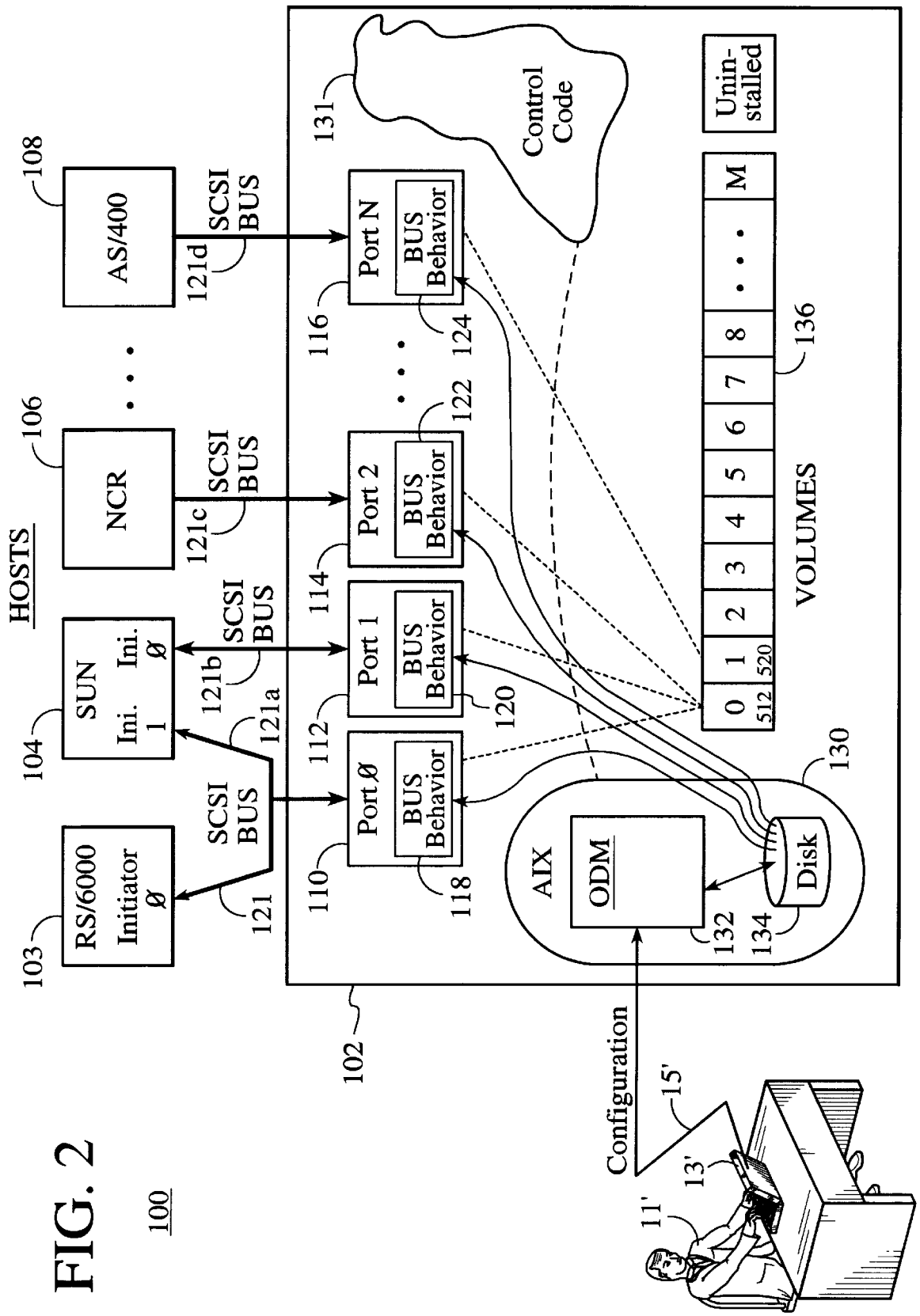
FIG. 2 is a block diagram of a storage subsystem in accordance with the present invention.

To more particularly describe the present invention in the context of a specific embodiment, refer now to FIG. 2, which is a block diagram of a storage subsystem coupled to a plurality of hosts in accordance with the present invention. It should be understood, that, as before mentioned, FIG. 2 is a simplified block diagram that describes the features that are important to the present invention. One of ordinary skill in the art recognizes that there a variety of other components and details that are conventional that would be used to implement the various features and elements described herein.

Referring back to FIG. 2, as is seen, the system 100 includes storage subsystem 102 and a plurality of SCSI hosts 00 103, 104, 106 and 108 coupled thereto via SCSI busses 121, 121a, 121b, 121c and 121d to ports 110, 112, 114 and 116 within the DASD storage subsystem 102. In this embodiment, SCSI host 103 is a RS/6000 SCSI host, SCSI host 106 is a NCR SCSI host and SCSI host 108 is an AS/4SCSI host. Although this figure shows four (4) SCSI hosts one of ordinary skill in the art readily recognizes that any number of SCSI hosts could be utilized and their use would be within the spirit and scope of the present invention. The storage subsystem 102 has elements which are substantially similar to the elements of storage subsystem 12 and these elements have been given similar number descriptions in FIG. 2. In this embodiment a customer engineer configures the object data manager 132 in a manner which allows for the SCSI host 103–108 to attach to a particular port 110–116. The DASD storage subsystem 102 also includes a plurality of volumes, each of the volumes being potentially utilized by different ports. A key difference between the present invention and the conventional system of FIG. 1 is the use of bus behavior tables 118, 120, 122 and 134 within the ports 102–108. The tables 118–124 are utilized to define and control the DASD storage subsystem's operation with the SCSI hosts 103–108.

Figure 3:
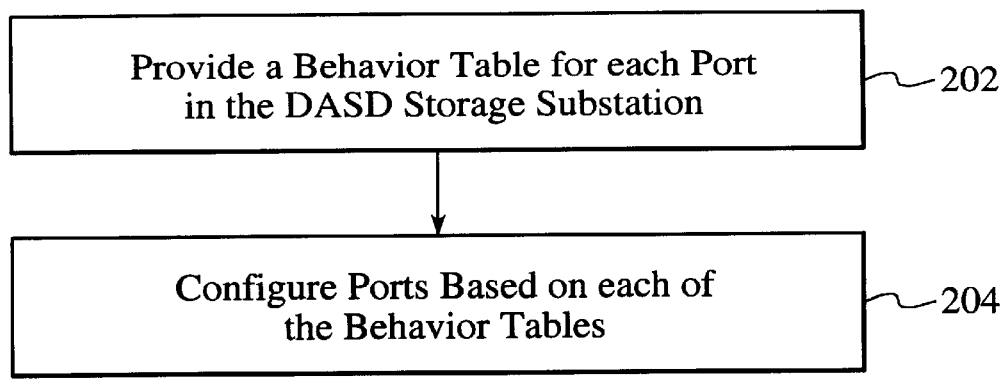
FIG. 3 is a flow chart of the operation of the system of FIG. 2.

FIG. 3 is a flow chart of the operation of the system 100. Referring now to FIGS. 2 and 3 together, first a bus behavior table 118–124 is provided for each port 110–116 in the DASD subsystem 102, via step 202. The bus behavior table defines the parameters associated with the particular attached SCSI host during SCSI operations. The bus behavior table provides more particularized information about the behavior of the attached SCSI host. This particularized information typically is based on published and empirical information derived for the use of the particular SCSI host that is attached based upon its SCSI operations. Next, the ports 110–116 are configured based on the bus behavior tables 118–124, via step 204.

The central code 131 uses the "bus behavior table" to contain a set of values which define or control the various aspects of the desired SCSI host. Each physical SCSI bus port (in a preferred embodiment up to 32 ports) has its own bus behavior table, therefore DASD can be configured to operate compatibly with many different kinds of hosts at the same time. The only constraint is that all of the SCSI hosts on a particular physical bus/port have to accept the same set of behaviors. For example, volume 0 has 512 bytes data blocks which can be utilized by SCSI host 103, 104 and 106. While it is seen that volume 1 has 520 byte data blocks that can be utilized by the SCSI host 108. It is also seen in appropriate circumstances two SCSI hosts can share data from the same port as illustrated by the SCSI hosts 103 and 104 sharing a common port 110.

Each of these various elements can be configured by the human configuration interfare, for each port 103–116 attached to the DASD storage subsystem 102. The human configuration interface is typically a graphics user interface which can be implemented utilizing a browser.

As is well known, the protocol for communication when over a SCSI bus is that an initiator sends data to a target address. In this embodiment, the plurality of SCSI hosts 103–108 are the initiators and the DASD storage subsystem 102 is the target. In a preferred embodiment mode pages data and inquiry data are initially set to some default values based on the bus behavior table. The mode pages data is then available for retrieval the values via mode sense and inquiry.

Figure 4:
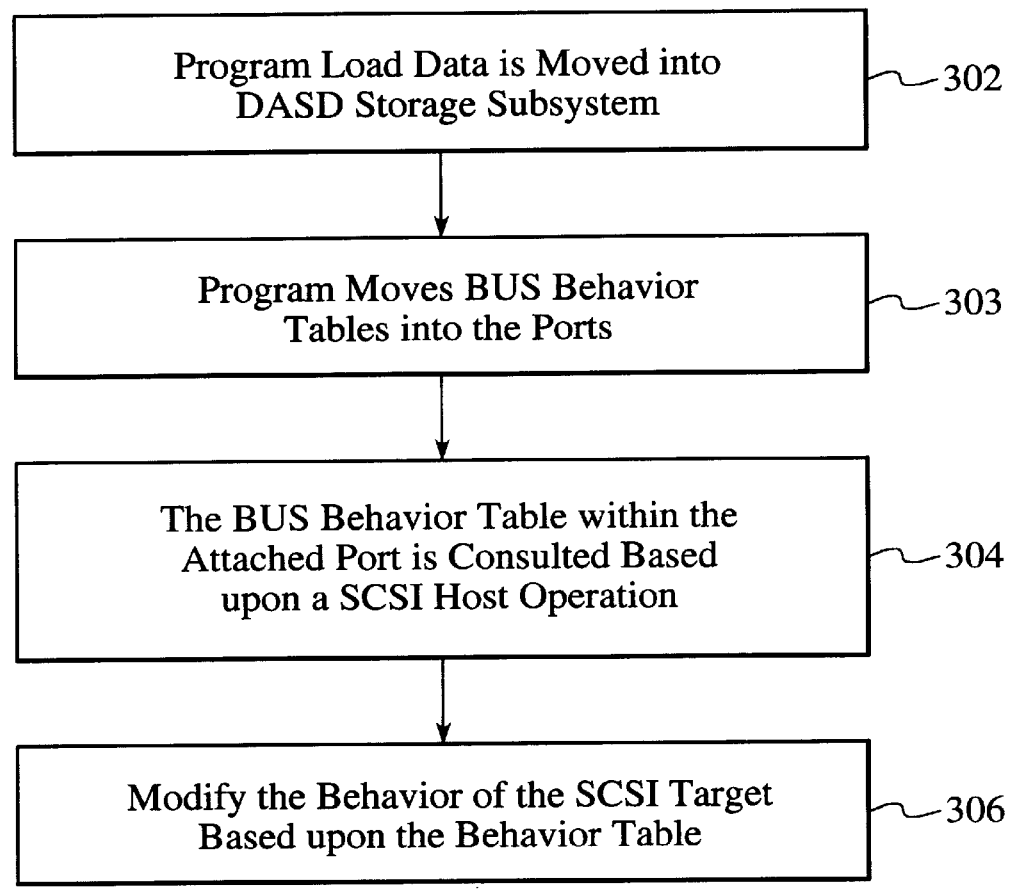
FIG. 4 is a flow chart of the operation of the code when personalizing a particular SCSI port's target behavior in accordance with the present invention.

To describe this feature in more detail refer now to FIG. 4. FIG. 4 is a flow chart of the operation of system when personalizing for a particular host in accordance with the present invention. Referring to FIGS. 2 and 4 together, first a program load is moved into the memory 134 the DASD storage subsystem 102, via step 302. Next, the bus behavior table 118–124 is moved into the attached port 110–116 and is consulted based upon the SCSI host operation, via steps 303 and 304. Finally, the behavior of the target is modified based upon the bus behavior table 118–124, via step 306.

The behavioral aspects currently included in the set of configurable behaviors is described in a preferred embodiment in the code structures shown below. The default values are assumed unless the human driven configuration interface sets them differently:

1. BusBehavior (aka Host Behavior)

The elements of this structure define the SCSI bus behavior of the targets on this port. Different host types require different behaviors, thus the configuration process can define the desired behavior on a port.

2. TargetAddressVector;

In this embodiment a vector identifies the target addresses to be captured from the SCSI bus. Each bit identifies a target address.

3. Block Size

This sets the data block size.

Block Size—Sector size in bytes

Must be: 512 bytes default; typical for hosts except AS400

520 bytes used by AS400.

4. Host Type

This provides for the type of host list. The following host types are mutually exclusive:

FB_RS6000—default—0;

FB_AS400—1;

FB_HP700—2;

FB_HP800—3;

FB_SUN—4;

FB_NCR—5;

5. Port Type

This provides the type of port. The following port types are mutually exclusive:

FB_PARALLEL_SCSI_THICK—0 (default)

FB_PARALLEL_SCSI_THIN—1

FB_SERIAL_SCSI—2.

6. Bus Behavior Flags

These flags modify the behavior of the port.

7. TargetNegotiateOk

This allows the target to initiate bus negotiations.
Default=true.

8. BeforeReadyOk

This allows the target to respond before it is ready following a reset operation.
Default=true.

9. Synchronous Period

This defines the negotiation starting point.

Default is 0x0C (50 ns)

Valid values=0x0C–0x4B.

10. Synchronous Offset

This defines the negotiation starting point.

Default is 0x10

Valid values=0–16.

11. Bus Width (1 byte)

This defines the negotiation starting point.

Default is 1

Valid Values=0, 1

12. Uninstalled Volume Value (1 byte)

This value is returned as byte 0 of Inquiry data.

0x7F—default

0x20.

13. Machine Type (4 characters)

This is to be reported in Inquiry data.

Must be: - '2', '1', '0', '5'. Default data (used for all but AS400) - '9', '3', '3', '7'.

14. Machine Model Number (3 characters)

This is to be reported in Inquiry data.

Must be: - 'E', '0', '9'. Default (used for all but AS400) - '4', '8', 'C' -'5', '9', 'C'.

Accordingly, the present invention is directed to a method and system for allowing for a flexible storage subsystem which allows a plurality of SCSI hosts to be coupled thereto. The system will also allow for some SCSI hosts to be attached to the same port within the subsystem. This is accomplished through the use of a bus behavior table within each of the ports. These behavior tables define the characteristics of the particular SCSI host that is to be attached to a particular port. In so doing, multiple ports can be provided within the storage subsystem, each of them having its own bus behavior table. The bus behavior table thereby personalizes the behavior of the DASD storage subsystems in a manner that allows for optimum operation with that SCSI host.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A direct access storage device (DASD) storage subsystem comprising:

a plurality of ports, each of the plurality of ports including a table, each of the tables for defining the behavior of a small computer system interface (SCSI) target appearing on a particular port; and means for configuring the plurality of ports utilizing the tables within the ports.

2. The DASD storage subsystem of claim 1 including an object data manager system comprising:

an object data manager;

a disk which communicates with the object data manager; and control code for communicating with the object data manager and the disk, the object data manager system for communicating with the tables so as to configure the ports.

3. The DASD storage subsystem of claim 2 in which a plurality of SCSI hosts can be attached to a single port.

4. The system of claim 3 wherein each of the plurality of tables comprises a bus behavior table.

5. The system of claim 4 wherein the bus behavior table comprises a plurality of code structures for defining the behavior of the ports.

6. The system of claim 5 wherein the code structures include a target address vector structure; a data size structure; a host type structure, port type structure, flags for modifying the behavior of the port, target negotiate structure, synchronous period structure, synchronous offset structure, and bus width structure.

7. The system of claim 6 wherein the structures within the bus behavior table have default values.

8. The DASD storage subsystem of claim 2 in which the plurality of ports are configured via a graphical user interface (GUI).

9. The DASD storage subsystem of claim 8 in which the GUI is a web browser.

10. A small computer system interface (SCSI) system comprising:

a plurality of SCSI hosts; and a direct access storage device (DASD) storage subsystem comprising a plurality of ports, each of the plurality of ports being coupled to at least one of the plurality of SCSI hosts, each of the plurality of ports including a table, each of the tables for defining a target behavior of a particular port; and means for configuring the plurality of ports utilizing the tables within the ports.

11. The SCSI system of claim 10 wherein the DASD storage subsystem includes an object data manager system, the object manager data system further including an object data manager;

a disk which communicates with the object data manager; and control code for communicating with the object data manager and the disk, the object data manager system for communicating with the tables so as to configure the ports.

12. The SCSI system of claim 11 in which a plurality of SCSI hosts can be attached to a single port.

13. The SCSI system of claim 12 in which the GUI is a web browser.

14. The SCSI system of claim 11 in which the plurality of ports are configured via a graphical user interface (GUI).

15. The SCSI system of claim 11 wherein each of the plurality of tables comprises a bus behavior table.

16. The SCSI system of claim 15 wherein the bus behavior table comprises a plurality of code structures for defining the behavior of the port associated with the table.

17. The SCSI system of claim 16 wherein the code structures include a target address vector structure; a data size structure; a host type structure, port type structure, flags for modifying the behavior of the port, target negotiate structure, synchronous period structure, synchronous offset structure, and bus width structure.

18. A method for allowing a plurality of small computer system interface (SCSI) hosts to interact with a direct access storage device (DASD) storage subsystem, the DASD storage subsystem including a plurality of ports, the method comprising the steps of:

(a) providing a behavior table for each of the plurality of ports in the DASD storage subsystem; and (b) configuring each of the plurality of ports based on its associated behavior table.

* * * * *